United States Patent [19]

Arcuri, Jr.

[11] 4,188,463
[45] Feb. 12, 1980

[54] SODIUM-SULFUR BATTERY AND METHOD OF MAKING A DOUBLE CARBON MAT-COMPOSITE SULFUR ELECTRODE FOR USE IN SODIUM-SULFUR CELLS

[75] Inventor: Joseph D. Arcuri, Jr., Rexford, N.Y.

[73] Assignee: Electric Power Research Institute, Inc., Palo Alto, Calif.

[21] Appl. No.: 8,379

[22] Filed: Feb. 1, 1979

[51] Int. Cl.² .............................................. H01M 4/36
[52] U.S. Cl. ................... 429/104; 264/104; 264/255; 264/257
[58] Field of Search .................... 429/101–105, 429/112; 264/104, 105, 255, 257

[56] References Cited

U.S. PATENT DOCUMENTS

| | | | |
|---|---|---|---|
| 3,926,674 | 12/1975 | Jonville | 264/104 |
| 4,053,689 | 10/1977 | Breiter | 429/102 |
| 4,070,527 | 1/1978 | King et al. | 429/104 |
| 4,140,841 | 2/1979 | Breiter | 429/104 X |

Primary Examiner—Charles F. LeFevour
Attorney, Agent, or Firm—Townsend and Townsend

[57] ABSTRACT

An improved sodium-sulfur cell having a sulfur electrode for a physically-large battery cell comprises in its pre-emplaced condition at temperatures below operating temperature at least one preformed solid composite structure defining a plug conforming to the interior shape of an electrolyte containment structure. The plug segments are constructed of fibrous electrically conductive material in a compressed elastic condition having a relatively thin layer of electrically resistive material along the face of the segment which will confront the electrolyte. The conductive material and the resistive material are permeated with a binder of molten sulfur which has been solidified. The sulfur electrode is adapted to be inserted within a battery cell container and subsequently melted so that the structure can expand and compress against the inner walls of the containment structure.

10 Claims, 6 Drawing Figures

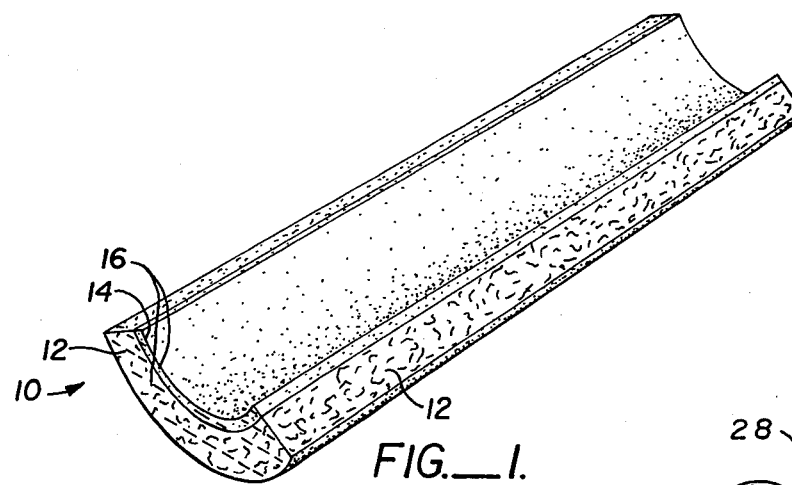
FIG._1.
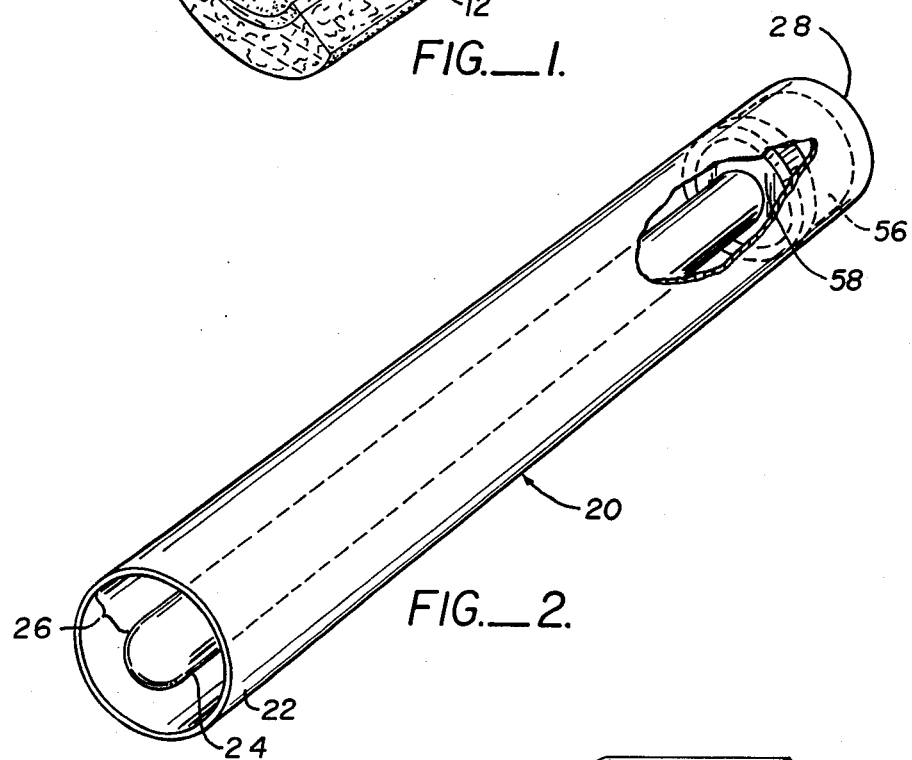
FIG._2.
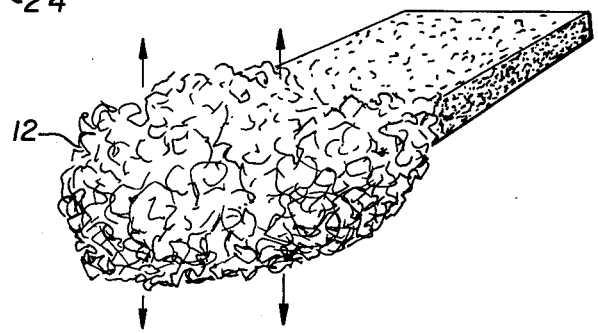
FIG._3A.

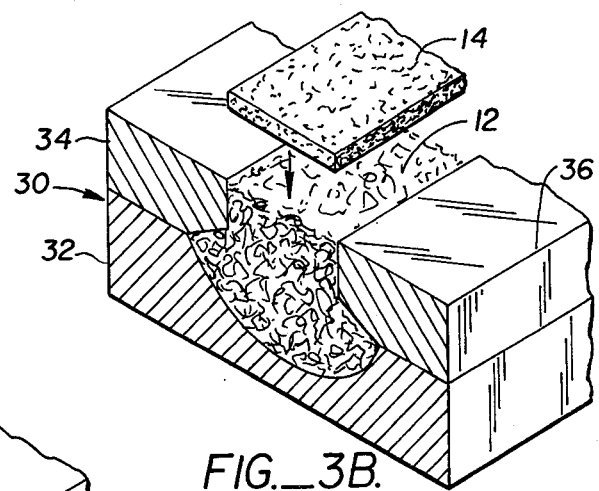
FIG._3B.
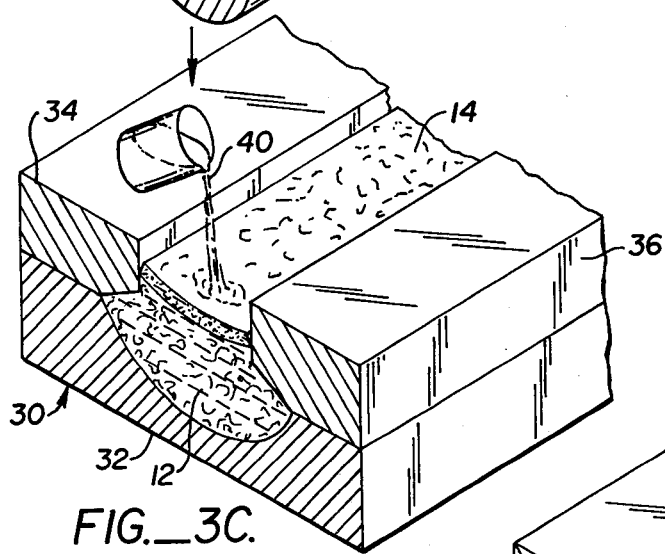
FIG._3C.
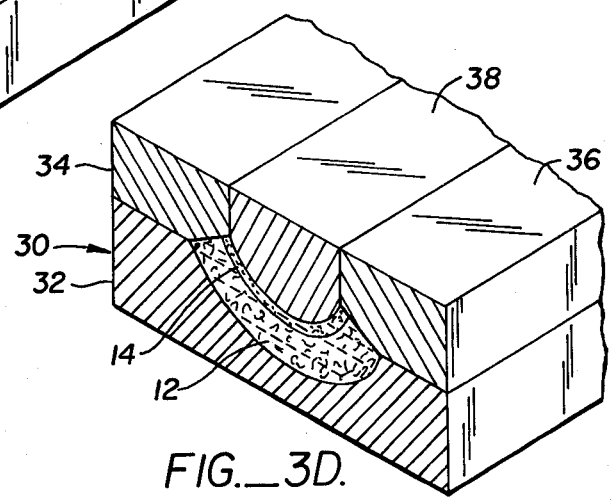
FIG._3D.

SODIUM-SULFUR BATTERY AND METHOD OF MAKING A DOUBLE CARBON MAT-COMPOSITE SULFUR ELECTRODE FOR USE IN SODIUM-SULFUR CELLS

BACKGROUND OF THE INVENTION

This invention was made under contract with or supported by the Electric Power Research Institute, Inc.

FIELD OF INVENTION

This invention relates to a method of making a sulfur electrode with composite carbon mats for sodium-sulfur batteries. In attempting to develop new technologies for economical storage of energy, the sodium-sulfur battery offers many advantages. The sodium-sulfur battery is rechargeable, has large storage capacity, and employs relatively inexpensive materials of low atomic weight, so that energy storage capacity per unit weight is greater than heavier elements, such as lead.

While the properties of sodium and sulfur as electrodes, in combination with a beta-alumina solid electrolyte have many intrinsic advantages, they also provide many new and unique problems. The sodium-sulfur battery must operate at elevated temperatures, on the order of 300° C. or above. At these elevated temperatures, both sodium and sulfur can be highly reactive and corrosive with a wide variety of materials. Furthermore, electricity must be introduced into and removed from the sulfur electrode at these elevated temperatures. Sulfur, however, is electrically nonconductive so that means must be provided for the introduction and removal of electrons at the sulfur electrode.

It has further been found that during discharge and recharge, a film of high resistance sulfur may build up at the electrolyte surface, inhibiting passage of electricity to the electrode.

Faced with these unique problems associated with the nonconductive sulfur electrode, with a solid electrolyte, and with high temperatures of operation, various new approaches have been required to provide for practical efficiently operating batteries.

DESCRIPTION OF THE PRIOR ART

U.S. Pat. No. 4,070,527 describes the use of graduated resistive material in a sulfur electrode, specifically mats of carbon fibers having differential resistivity. U.S. Pat. No. 4,053,689 describes the use of a carbon fiber mat for contacting a molybdenum or chromium coated surface of an aluminum conductor to provide electrical conductance through a sulfur electrode. U.S. Pat. No. 4,048,390 is cited as of interest.

Small prototype cell cathode compartments for sodium-sulfur batteries have been constructed in a manner allowing thin, electrically resistive layers of carbon mat to be easily sandwiched between the solid electrolyte tube and a plug consisting of compressed electrically conductive carbon mat and sulfur.

The construction of physically large sodium-sulfur cells will include a thermal compression bonded seal between a tubular metal cathode container and a ceramic insulating header at one end. A solid electrolyte tube will be coaxially positioned within the tubular container, providing a tubular annulus for insertion of the plug. However, the thin gauze mat wrapped around the electrolyte is extremely susceptible to damage when preparing the sulfur electrode. Notwithstanding, it is necessary to insure tight contact between the cathode container walls and the plug for minimum electrical resistance.

SUMMARY OF THE INVENTION

According to the invention, a sulfur electrode for a physically large sodium-sulfur battery cell comprises, in its pre-emplaced condition at temperatures below battery operating temperature, at least one preformed solid composite segment defining a plug, conforming to the exterior shape of a solid electrolyte and interior shape of an electrode vessel. The plug is composed of fibrous electrically conductive material in a compressed elastic condition and has a relatively thin layer of an electrically resistive matrix material along the face of the plug segment which will confront the electrolyte. The conductive matrix material and the resistive matrix material are permeated with a binder of molten sulfur which has been solidified.

The composite plug is constructed in identical segments by plucking of fluffing a selected amount of electrically conductive fibrous matrix material to establish an elastic porous structure having memory of expansion, subsequently packing the porous structure within a mold shaped to conform to the spacing and shape of duplicate segments of the solid electrolyte containment vessel, optionally placing an electrically resistive mat layer onto said porous structure, heating the mold, then permeating the porous structure and mat layer with molten sulfur by filling the mold with sulfur, and then cooling the mold to solidify the resultant composite structure to its desired shape. The resultant composite structure defines a plug segment which can then be removed from the mold and inserted into the electrolyte vessel of the sodium-sulfur battery without damage to the fibrous structure. Several plug segments are inserted into the containment vessel against the solid electrolyte. The cell is then heated whereby the sulfur is remelted, allowing the porous structure to expand thereby to abut to the inner walls of the vessel and to establish the intended electrical contact. The plug segments melt together to form a single plug having a substantially uniform structure distribution.

It is an object of this invention to provide a sulfur electrode which allows for easy insertion into the annular space between solid walls of a containment vessel such as between a solid electrolyte and a vessel wall, and particularly in a manner which protects the elements of the sulfur electrode from damage.

It is a further object of this invention to provide a single-piece sulfur electrode comprised of composite elements bonded together. Such a solid electrode simplifies final assembly of physically large sodium-sulfur battery cells.

It is a still further object of the invention to provide for a method to insert a relatively thin layer of electrically resistive carbon mat material and the like next to a solid electrolyte in a manner which minimizes the possibility of damage to the thin layer.

It is a still further object of the invention to assure effective electrical contact between the electrode and the electrolyte within a sodium-sulfur battery cell. In particular, it is an object to establish such good electrical contact while at the same time eliminating a space filler abutting the requisite resistive layer. This is accomplished by permitting the matrix material to decompress to a point where good physical contact is made between its fibers and the walls of the containment vessel.

A further object and advantage of the invention is the provision of a technique for constructing physically large sulfur electrode plugs by employing relatively small plug segments which can be conveniently assembled.

Further objects and the advantages of this invention will be apparent upon reference to the following detailed description taken in conjunction with the accompanying drawings.

BRIEF DESCRIPTION OF THE DRAWINGS

FIG. 1 is a perspective view with a transverse cross-section illustrating a composite electrode plug segment according to the invention.

FIG. 2 is a perspective view in partial cutaway of a cathode container with a solid electrolyte core.

FIGS. 3A–D illustrate the steps for constructing a composite plug segment according to the invention.

DESCRIPTION OF PREFERRED EMBODIMENTS

To further understand the subject invention, the drawings will now be considered. In FIG. 1, an exemplary sulfur electrode plug segment 10 of a sodium-sulfur battery is depicted. The plug segment 10 comprises three elements, namely: (1) an electrically conductive (low electrical resistivity) fibrous mat 12 which has been plucked or fluffed and then collapsed to a compressed elastic condition; (2) a relatively high resistivity layer 14 of fibrous material along one elongate face of the plug segment 10; and (3) a sulfur binder 16 permeating both the porous mat 12 and the porous layer 14.

The sulfur-fiber composite structure is shaped to fit within a containment vessel 20. Referring to FIG. 2 the vessel 20 is typically cylindrical having an outer or cell wall 22 and a tubular inner wall or solid electrolyte core 24. An annular cylindrical void 26 is defined between wall 22 and concentric core 24. The vessel 20 is sealably closed at one end 28. The plug segment 10 is of a shape which is adapted to fill at least a portion of the annular void. Plug segments 10 may be assembled in groups of two, three or more tangentially around the core 24 and stacked along the extent of the core to define the electrode plug. The assembled plug segments 10 and the containment vessel 20 are referred to as the cathode cell of the sodium-sulfur battery.

An important feature of the invention is the packing of the mat 12 such that the mat 12 is maintained under compression with residual elasticity after being initially permeated with molten sulfur. The construction of the plug segment 10 incorporating this feature is explained in reference to FIGS. 3A–D.

Referring first to FIG. 3A, a predetermined amount of electrically conductive current collector matrix material or mat material 12, such as carbon or graphite felt or mat, is made fluffy or springy by gently pulling apart or plucking the fibers. This establishes an elastic porous structure having a memory of expansion.

Referring to FIG. 3B, the mat 12 is packed into a mold 30 adapted to conform to the interior space of a cylindrical containment vessel having a central coaxial core. The mold 30 comprises a base 32 and side pieces 34 and 36. The mold 30 may conveniently define one-third of an arc of the circumference of a cylindrical plug. Any convenient fraction of an arc may be selected. A relatively large amount of mat 12 is packed into the mold so that it is tightly compressed. A thin resistive material layer 14 is then laid over the mat 12. The layer 14 may be a resistive material such as carbon, graphite felt or mat, carbonized cotton or cloth.

The mold 30 is laid horizontal and a top piece 38 is placed over layer 14 between side pieces 34 and 36. The mold 30 is then heated to about 125° to 130° C. Thereafter, a predetermined amount of molten sulfur 40 is added to the mold.

Referring to FIG. 3D, the mold 30 with the top piece 38 in place is then allowed to cool to room temperature or other convenient temperature permitting the sulfur to solidify. The composite plug segment 10 comprising the compressed fiber mat 12, the layer 14 and the solidified sulfur 40 is then removed from the mold 30, whereupon the plug segment 10 may be inserted without substantial risk of damage thereto into a containment vessel 20 of the type illustrated in FIG. 2.

EXAMPLE

A plug segment 10 of the type herein described has been constructed as follows. A mat 12 sample of Graphite Mat #32 manufactured by Union Carbide Corporation having a mass of 14.3 grams was fluffed and then evenly stuffed into a horizontally disposed Teflon-coated mold of the shape shown in FIGS. 3B–D. The mold was approximately 37 cm in length, corresponding to just less than the length of the containment vessel into which the plug segment was designed to be inserted.

A thin layer 14 of Graphite Mat #31 manufactured by Union Carbide Corporation was placed on top of the #32 mat 12 in the mold 30. The #31 mat layer 14 was approximately 0.2 cm in thickness and had a mass of 0.45 grams. Its width was 3.25 cm and length was 37 cm. Both the #31 layer 14 and #32 mat 12 were compressed together into the mold 30 by pressing down on the mold top piece 38 (FIG. 3C) which had an identational convex face confronting the layer 14 simulating that of the solid electrolyte tube 50 within the containment vessel 20. The mold 30 was then heated to about 130° C. for sixty minutes.

With the mold 30 in a heated condition, the top piece 38 was removed, and 142.3 grams of molten sulfur 40 were poured into the cavity containing the mat 12 and layer 14. The mold top piece 38 was then replaced and clamped, and all was cooled to room temperature, the sulfur solidifying to the shape of the mold 30. A composite solid sulfur electrode plug segment 10 was then removed from the mold 30.

Referring again to FIG. 2, the electrolyte 24 employed with the sulfur electrode according to the invention may be of beta-alumina prefabricated to a desired configuration. Conveniently, the electrolyte 24 can be in the shape of a tube. The container 20 is frequently called the cathode container. The container 20 and tube 24 are sealed to a ceramic insulating header 56 at the end 28 by a thermal compression bonded seal 58. In this manner a reliable metal to ceramic seal is provided which is capable of containing molten sulfur.

The container 20 may be of any convenient material, either conductive or nonconductive, preferably conductive. Useful materials include molybdenum and chrominum-coated aluminum or low carbon steel.

After the sulfur electrode has been formed, the sulfur-containing cathode container can then be used to assemble a sodium-sulfur battery.

The subject method and resulting product provides a number of advantages. First, the resulting method and apparatus can be easily and efficiently fabricated. The high resistivity cover layer or layers 14 can be readily positioned in contact with the electrolyte core 24 to provide a desired uniform high resistive contact at the electrolyte surface.

Several layers 14 of different resistivity may be stacked on top of one another in order to achieve desired graded resistivity in the sulfur electrode. A discussion of using graded resistivity in the sulfur electrode is described in U.S. Pat. No. 4,070,527.

The compressed low resistivity conductive carbon is easily positioned in the containment vessel about the electrolyte core with the high resistivity mat layer confronting the electrolyte core. Good electrical conductivity can be maintained between the conductive carbon mat and the fibers of the high resistivity layers. The molten sulfur is found to wet the carbon so as to make good electrical contact between the sulfur and the conductive material.

The plug segment, introduced as a solid into the container, minimizes the chance of damage to the delicate fibers of the mat materials. The conductive material being compressed and under pressure expands to the shape of the enclosure when the sulfur melts. Thus, the sulfur electrode is easily formed to the desired dimension, avoiding voids and providing for excellent uniformity in electrical conductivity. If, on the other hand, the high resistivity layer were damaged, the result would be lowered resistivity at the breaks in the layer, which causes localized sulfur deposition at the electrolyte interface, inefficient electrical contact and operational degradation.

A sulfur electrode can be conveniently assembled from a plurality of plug segments, as for example by stacking around and along an electrolyte core and then melting the plug segments so that they fuse into a single electrode.

In accordance with this invention, a simple, rapid and efficient method is provided for forming a sulfur electrode in a sodium-sulfur battery. Problems of the prior art are avoided, since the subject method avoids any machining, the various components being easily fitted or formed.

Although the foregoing invention has been described in some detail by way of illustration and example for purposes of clarity of understanding, it will be obvious that certain changes and modifications may be practiced within the scope of the appended claims.

What is claimed is:

1. A method for making a composite sulfur electrode for a sodium-sulfur battery having a containment vessel and a solid electroyte element within said vessel comprising the steps of:
   fluffing a selected amount of electrically conductive fibrous matrix material to establish an elastic porous structure having memory of expansion;
   packing said porous structure under compression within a mold having a shape conforming to at least a portion of an interior of said containment vessel wherein said mold has a wall conforming to the shape of a surface portion of said solid electrolyte element within said vessel;
   introducing molten sulfur into the porous structure in an amount sufficient to substantially permeate said porous structure; and thereafter
   allowing the molten sulfur to solidify to form a composite sulfur electrode segment adapted to be inserted into said containment vessel.

2. The method claimed in claim 1 further comprising the step of introducing a relatively thin layer of material having relatively high electrical resistivity into contact with said porous structure along said electrolyte-shape-conforming wall prior to the introducing of said molten sulfur; and introducing said molten sulfur also into said layer.

3. The method claimed in claim 1 wherein said mold is heated during the introduction of said molten sulfur.

4. An improved sodium-sulfur battery comprising a containment vessel, a solid electrolyte element within said containment vessel, and a sulfur electrode formed by the method of:
   fluffing a selected amount of electrically conductive fibrous matrix material to establish an elastic porous structure having memory of expansion;
   compressing said porous structure within a mold having a shape defining a segment, said segment conforming to a portion of an interior of said containment vessel, wherein said mold has a wall conforming to the shape of a surface portion of said solid electrolyte element within said vessel;
   introducing a relatively thin layer of relatively high electrically resistive fibrous material between said porous structure and said electrolyte-shape-conforming wall;
   introducing molten sulfur into said mold in an amount sufficient to substantially completely permeate said layer and said porous structure;
   allowing said sulfur to cool to a solid to form a composite sulfur electrode segment adapted to be inserted into said containment vessel;
   inserting a plurality of said segments into said containment vessel with said fibrous material impinging upon said solid electrolyte element; and
   melting said sulfur in said plugs in order to allow said porous structure to expand within said containment vessel to form a sulfur electrode in said containment vessel having substantially uniform structure distribution and electrical contact with said electrolyte element.

5. The sodium-sulfur battery as claimed in claim 4 wherein said mold is heated during the introduction of said molten sulfur.

6. The sodium-sulfur battery as claimed in claim 4 wherein said containment vessel comprises a tube and said solid electrolyte element comprises a tube concentrically disposed within said containment vessel wherein at least one electrode segment is inserted into said containment vessel in a manner such that said layer impinges upon said electrolyte element and wherein said electrode segment is heated to melt said sulfur, thereby allowing said porous structure to expand within said containment vessel to establish electrical contact under pressure through said porous structure and through said layer with said electrolyte element.

7. The sodium-sulfur battery as claimed in claim 6 wherein said containment vessel is a right circular cylinder and wherein said electrolyte element comprises a right circular cylinder coaxially disposed within said vessel.

8. The sodium-sulfur battery as claimed in claim 7 wherein said electrolyte element is permanently mounted within said containment vessel at one end thereof.

9. The sodium-sulfur battery as claimed in claim 8 further including a preformed seal, said electrolyte element being mounted to said seal and said seal being thermally pressed into one end of said containment vessel.

10. The sodium-sulfur battery as claimed in claim 4 further comprising a plurality of layers of fibrous material of selected graduated resistivity disposed between said high resistivity layer and said porous structure.

* * * * *